United States Patent
Suphellen et al.

(10) Patent No.: US 7,145,647 B2
(45) Date of Patent: Dec. 5, 2006

(54) MEASUREMENT OF SPATIAL COORDINATES

(75) Inventors: Harald Suphellen, Lierskogen (NO); Øyvind Røtvold, Hvalstad (NO); Knut Amdal, Baerums Verk (NO)

(73) Assignee: Metronor ASA, Nesbru (NO)

( * ) Notice: Subject to any disclaimer, the term of this patent is extended or adjusted under 35 U.S.C. 154(b) by 127 days.

(21) Appl. No.: 10/779,169

(22) Filed: Feb. 11, 2004

(65) Prior Publication Data

US 2004/0160594 A1 Aug. 19, 2004

(30) Foreign Application Priority Data

Feb. 14, 2003 (EP) .................................. 03003458

(51) Int. Cl.
*G01B 11/26* (2006.01)
*G01C 1/00* (2006.01)

(52) U.S. Cl. ................. 356/141.1; 356/3.01; 356/4.01; 356/5.01; 250/201; 33/228

(58) Field of Classification Search .............. 356/141.1
See application file for complete search history.

(56) References Cited

U.S. PATENT DOCUMENTS

| | | | |
|---|---|---|---|
| 4,714,339 A | 12/1987 | Lau et al. | |
| 5,440,392 A | 8/1995 | Pettersen et al. | |
| 5,530,549 A | 6/1996 | Brown | |
| 5,835,220 A * | 11/1998 | Kazama et al. | 356/369 |
| 5,973,788 A | 10/1999 | Pettersen et al. | |
| 6,166,809 A * | 12/2000 | Pettersen et al. | 356/612 |
| 6,345,153 B1 * | 2/2002 | Kotani et al. | 396/106 |
| 6,389,158 B1 | 5/2002 | Pettersen et al. | |
| 2002/0152622 A1* | 10/2002 | Granger | 33/288 |

FOREIGN PATENT DOCUMENTS

| | | |
|---|---|---|
| DE | 4124174 | 9/1992 |
| SE | 456454 | 10/1988 |
| WO | WO 91/16598 | 10/1991 |
| WO | WO 93/07443 | 4/1993 |
| WO | WO 97/14015 | 4/1997 |

OTHER PUBLICATIONS

McGlone, J. C. et al., 1989, "Analytic Data-Reduction Schemes in Non-Topographic Photogrammetry" in *Non-Topographic Photogrammetry*, H.W. Karara (ed.), American Society For Photogrammetry And Remote Sensing, 2nd Edn., Chap. 4-3.2.

* cited by examiner

*Primary Examiner*—Thomas H. Tarcza
*Assistant Examiner*—Luke D. Ratcliffe
(74) *Attorney, Agent, or Firm*—Volpe and Koenig, P.C.

(57) ABSTRACT

A system for measurement of spatial coordinates comprising a probing tool and a main measuring unit, wherein said probing tool comprises a reflective object element, observation mechanism located in a known position and orientation relative to said reflective object element and capable of observing targets; and wherein said main measuring unit comprises a distance measuring device capable of measuring a distance from said device to said reflective object element; a mechanism constructed and adapted to direct a measuring beam from said distance measuring device to said reflective object element; a direction determining mechanism constructed and adapted to determine a direction of a measuring beam; at least two targets located in known positions relative to said distance measuring device, whereby the orientation of said reflective object element can be determined from observations of said targets by said observation mechanism.

21 Claims, 6 Drawing Sheets

MEASUREMENT OF SPATIAL COORDINATES

FIELD OF THE INVENTION

This invention relates to coordinate measuring. More specifically, this invention relates to systems, devices and methods for measurement of spatial coordinates.

BACKGROUND & SUMMARY

Portable coordinate measuring systems are well known and play an increasingly important role in science and industry. Both mechanical and electro-optical approaches are known, but for the large measurement volumes often encountered, e.g., in automotive and aerospace applications, electro-optical systems dominate. Two important types of such systems are laser tracker systems and real-time photogrammetry-based systems.

Known laser tracker systems (see, e.g., FIG. 1) are based on a device 10 such as an interferometer or laser rangefinder which is capable of measuring the distance (d) to a reflective object element 12 (such as, e.g., a measurement mirror or prism), using a mechanism 14 (such as, e.g., a mirror) for directing a laser beam from the distance measuring device 10 in the desired direction, combined with a means 16 for determining this direction. A distance and two angles are measured for the interferometer laser beam in order to calculate the spatial coordinates of the reflection point or center of the measurement mirror or prism 12. The various components of a typical laser tracker system may be housed in a unit 18. Laser tracking systems are known in a number of different embodiments and are described, for example, in U.S. Pat. No. 4,714,339.

Commercially available laser tracking systems include those using spherically mounted retro-reflectors—SMRs—as the reflective object element 12. A more recent development is systems using an absolute distance meter, commonly known as an ADM, as the distance measuring device 10. Other systems use what is commonly referred to as a laser radar, and these systems use a reflective object element 12 which is not a separate piece of hardware, but which is the surface or a surface element of the object to measured itself. In other words, the reflective object element 12 (e.g., measurement mirror or prism) is replaced and the beam is reflected off the object surface itself. For such systems, certain restrictions exist on the permissible reflectivity of the object surface.

Current laser tracker and similar systems can only acquire the coordinates of a single point at any moment in time. This limitation means that only the position of the center of a hand-held reflective object element (e.g., measurement mirror or prism) can be determined, while the orientation or rotation angles of the reflective object element (measurement mirror or prism) remain unknown. Therefore, using current laser tracker systems, it is not possible to measure points other than those directly visible from the system main unit 18 comprising the distance measuring device 10. Also, using current laser tracker systems, it is difficult to measure small details, features or shapes that do not lend themselves to touching with the relatively bulky assemblies of the reflective object element 12. Attempts have been made to overcome these limitations. For example, U.S. Pat. No. 5,530,549 (see, e.g., FIG. 2) describes an optical means that allows a limited-length offset mechanism (such as a probe 20) to replace the reflective object element (such as a measurement mirror or prism 22), which is positioned exactly opposite the measurement mirror or prism relative to an absolutely flat mirror 23. Thereby, the laser tracker determines the coordinates of the virtual reflection center 21 although the laser beam B is actually reflected at the center of the reflective object element 22.

This development is suitable for a range of simple measurement tasks such as the measurement of small-diameter holes in planar surfaces, but it is limited with regard to freedom of orientation, length of probe and shape of probe. The mirror arrangement further relies on mechanical precision since no mathematical compensation for manufacturing inaccuracies—or subsequent dimensional changes often encountered during industrial use—can be made.

The second type of know systems, real-time photogrammetry-based systems use one or more cameras to observe significant features—often targets—in the measurement scene and then calculate the targets' spatial coordinates based on techniques ranging from simple triangulation methods to advanced bundle adjustment calculations. A number of embodiments of such systems are known, e.g., DE 41,24,174, EP 607,303 and U.S. Pat. No. 6,389,158, owned by Metronor AS of Norway.

A particular benefit of photogrammetry-based systems is their ability to measure the coordinates of multiple points simultaneously. This has enabled the development of flexible probing systems such as those described, e.g., in SE 456,454, whereby probes of any geometry can be attached to a measurement handle that has multiple targets embedded. Once the position and orientation of the measurement handle has been determined, the spatial coordinates of the probe—and therefore the point to be measured—can be computed.

Compared with laser tracker systems, photogrammetry-based systems provide for relatively efficient measurement of the small, complex features and details often found in industrial products, and they provide for efficient measurement of points outside direct line of sight.

Systems that combine features and elements of photogrammetry-based systems and laser tracker systems and that try to provide the benefits of both types of systems are known. For example, U.S. Pat. No. 6,166,809 (owned by Metronor AS of Norway) and EP 880,674, respectively, describe a combined system whereby the probe consists of a laser tracker measurement mirror or prism combined with a measurement handle of a real-time photogrammetry system. This system addresses many of the shortcomings of simple laser tracker systems such as the one described in U.S. Pat. No. 5,530,549, for instance, but is complex and expensive. Also, the accuracy with which the probe orientation or rotations can be determined depends on a number of factors including distance and camera resolution and is a limitation.

It is an objective of the present invention to provide a system and method for coordinate measuring of low complexity and high performance. This objective is attained by the systems and methods described herein and set forth in the appended claims.

BRIEF DESCRIPTION OF THE DRAWINGS

The above and other objects and advantages of the invention will be apparent upon consideration of the following detailed description, taken in conjunction with the accompanying drawings, in which.

DETAILED DESCRIPTION OF THE PRESENTLY PREFERRED EXEMPLARY EMBODIMENTS

The present invention provides a system and method that determines the orientation or rotation of a reflective object element.

Figure 1:
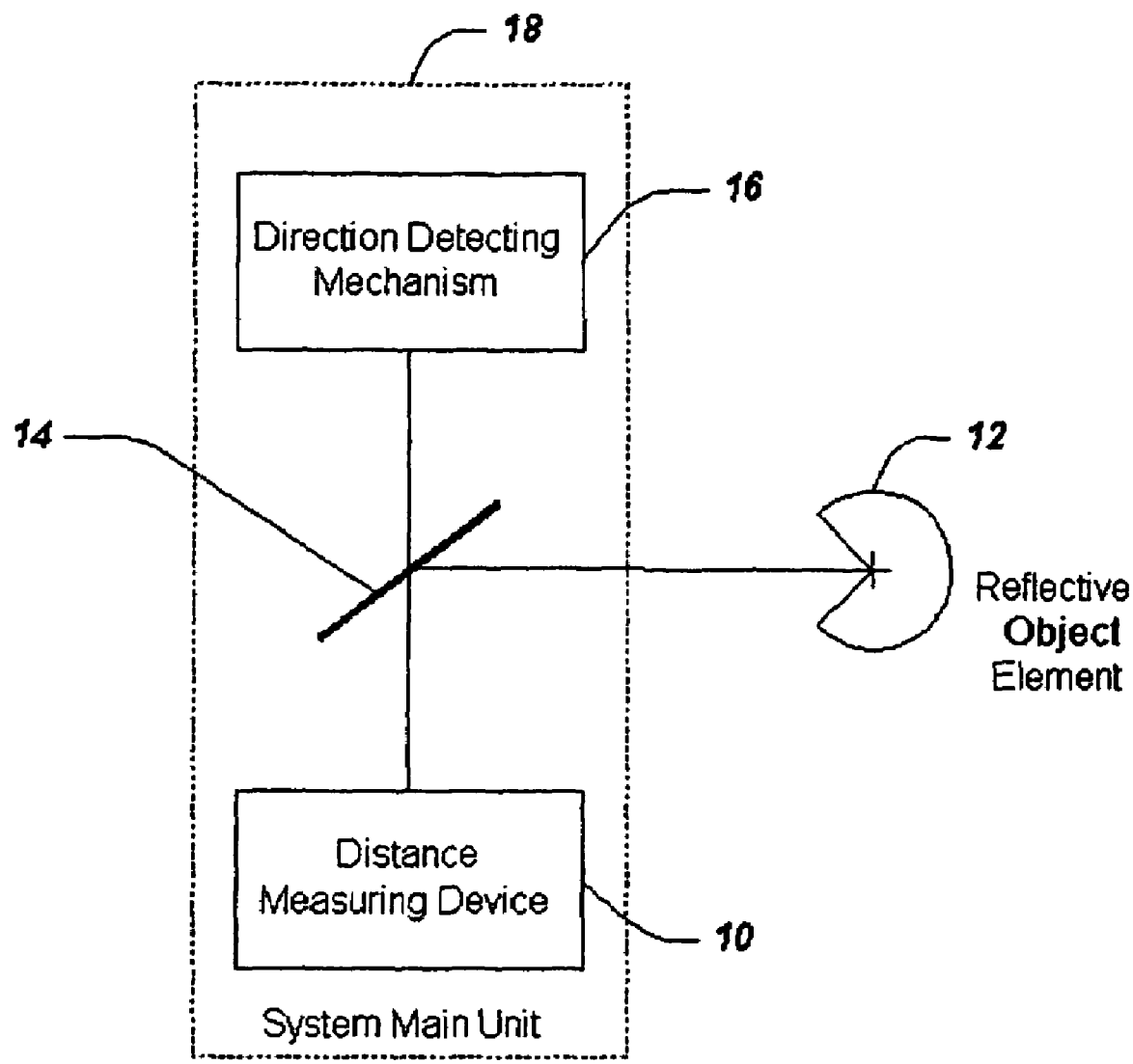
FIG. 1 schematically illustrates the operation of a known laser tracker system.
Figure 2:
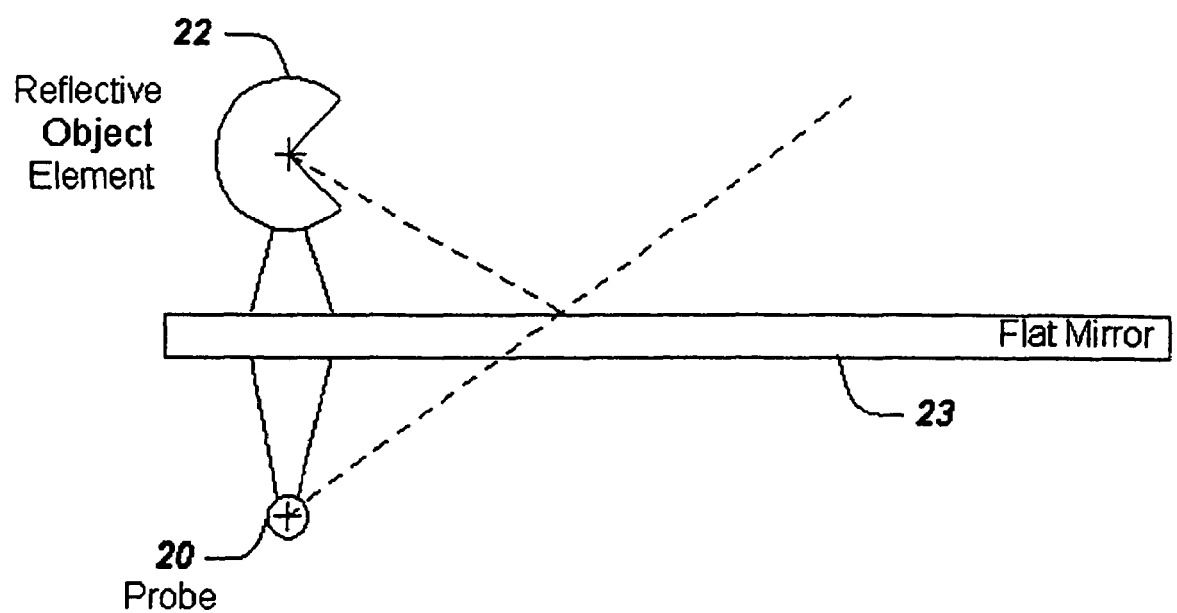
FIG. 2 schematically illustrates a known, state-of-the-art mirror arrangement used to overcome difficulties in measuring small details.
Figure 3:
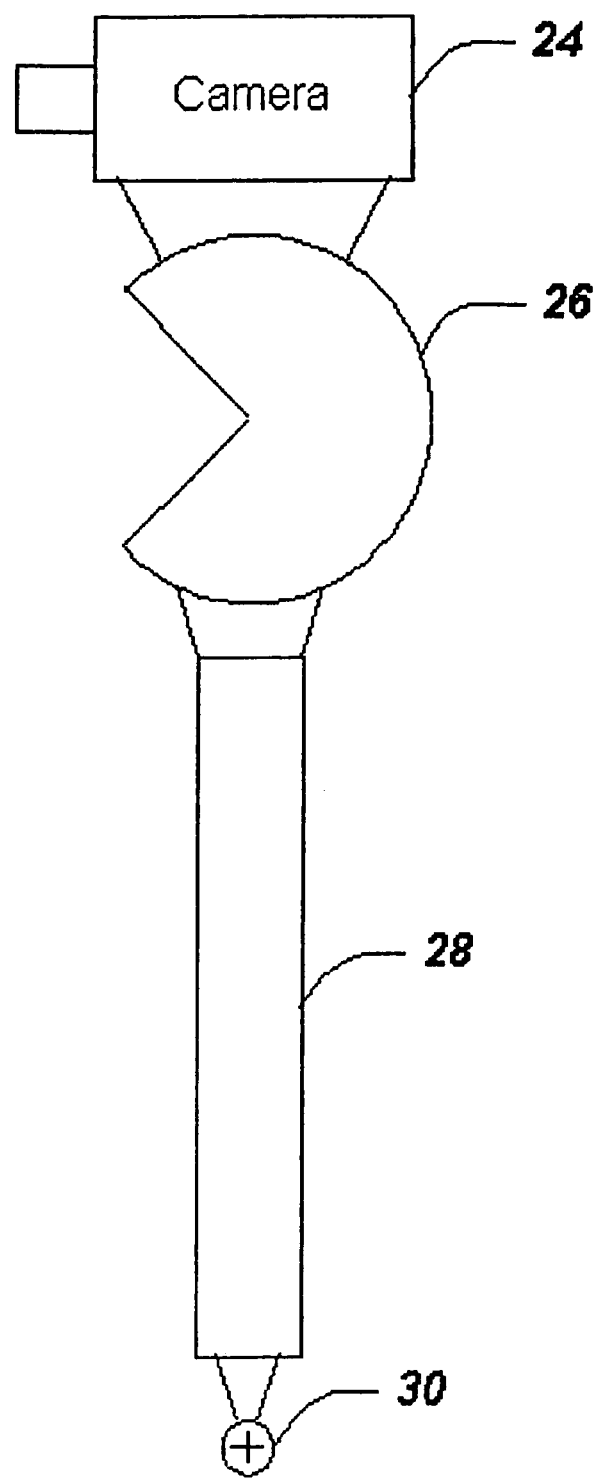
FIG. 3 schematically illustrates an arrangement of a mechanism for observing features or targets, an offset means and a reflective object element according to embodiments of the invention.

FIG. 3 schematically illustrates an arrangement of a mechanism for observing features or targets, an offset means and a reflective object element according to embodiments of the invention. An observation mechanism 24 (such as, e.g., a camera) is associated with a reflective object element 26 (such as, e.g., a measurement mirror or prism) such that the position and orientation of the observation mechanism 24 relative to the reflective object element 26 is known. The reflective object element 26 (and the observation mechanism 24) may be attached to an offset mechanism 28 such as, e.g., a probe, having a contact point 30. Preferably the reflective object element 26 is attached to the observation mechanism 24.

The probe or offset mechanism 28 can be attached to the reflective object element 26 in a number of different ways. In some preferred embodiments, a quick-lock bayonet-type attachment is used to connect the probe or offset mechanism 28 onto the reflective object element 26. Such a connection mechanism provides quick changing between offset mechanisms or probes of different configurations. In preferred embodiments, the observation mechanism 24 is a camera such as the Redlake MegaPlus® or any other digital camera model; and the offset mechanism 28 is a probe such as the light pen sold by Metronor AS of Norway, described in Swedish Patent No. 456 454 and Norwegian Patent No. 169 799.

Figure 4:
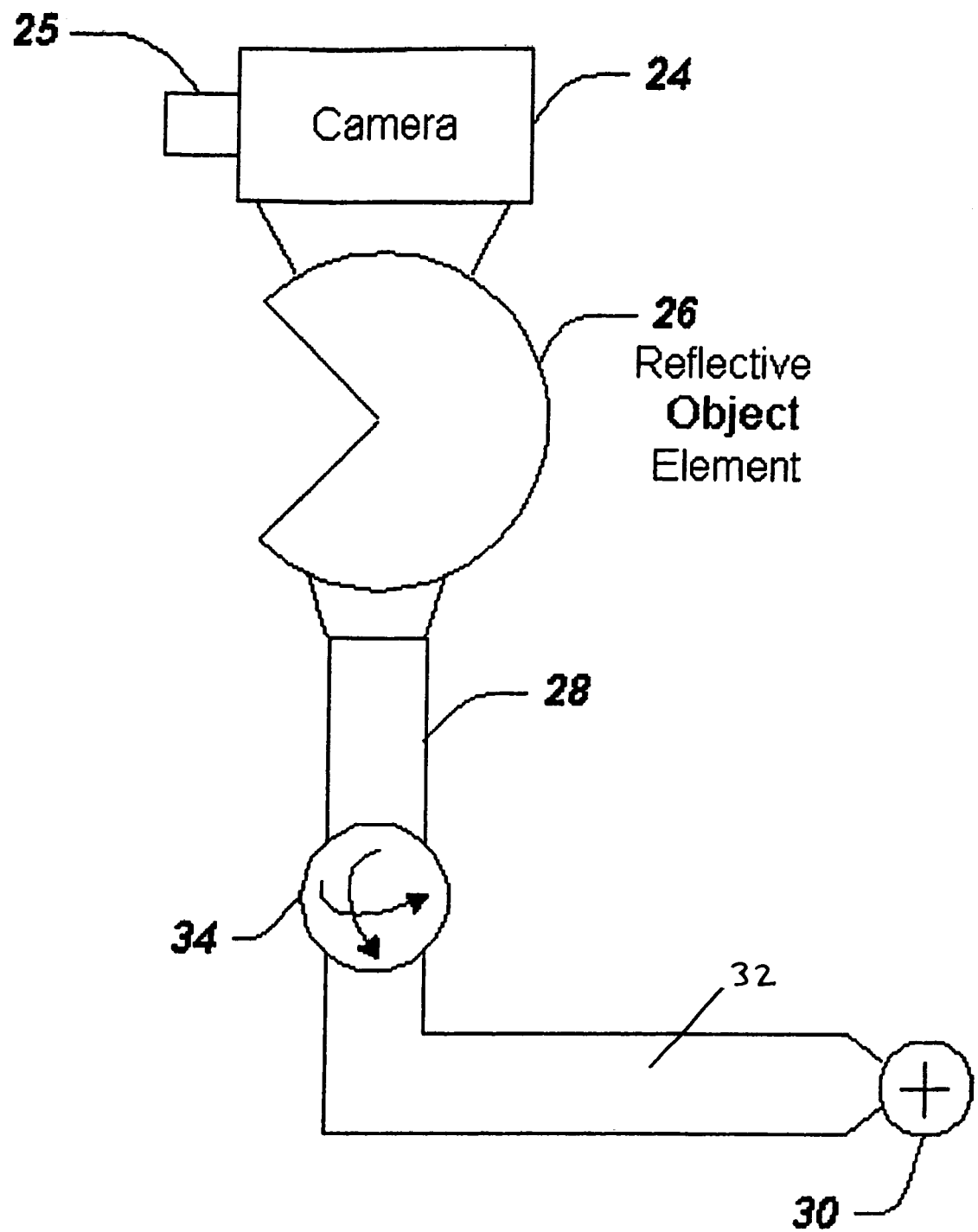
FIG. 4 schematically illustrates an arrangement of an offset mechanism connected to a reflective object element and an observation mechanism via a mechanism for relative rotation according to embodiments of the invention.
Figure 5:
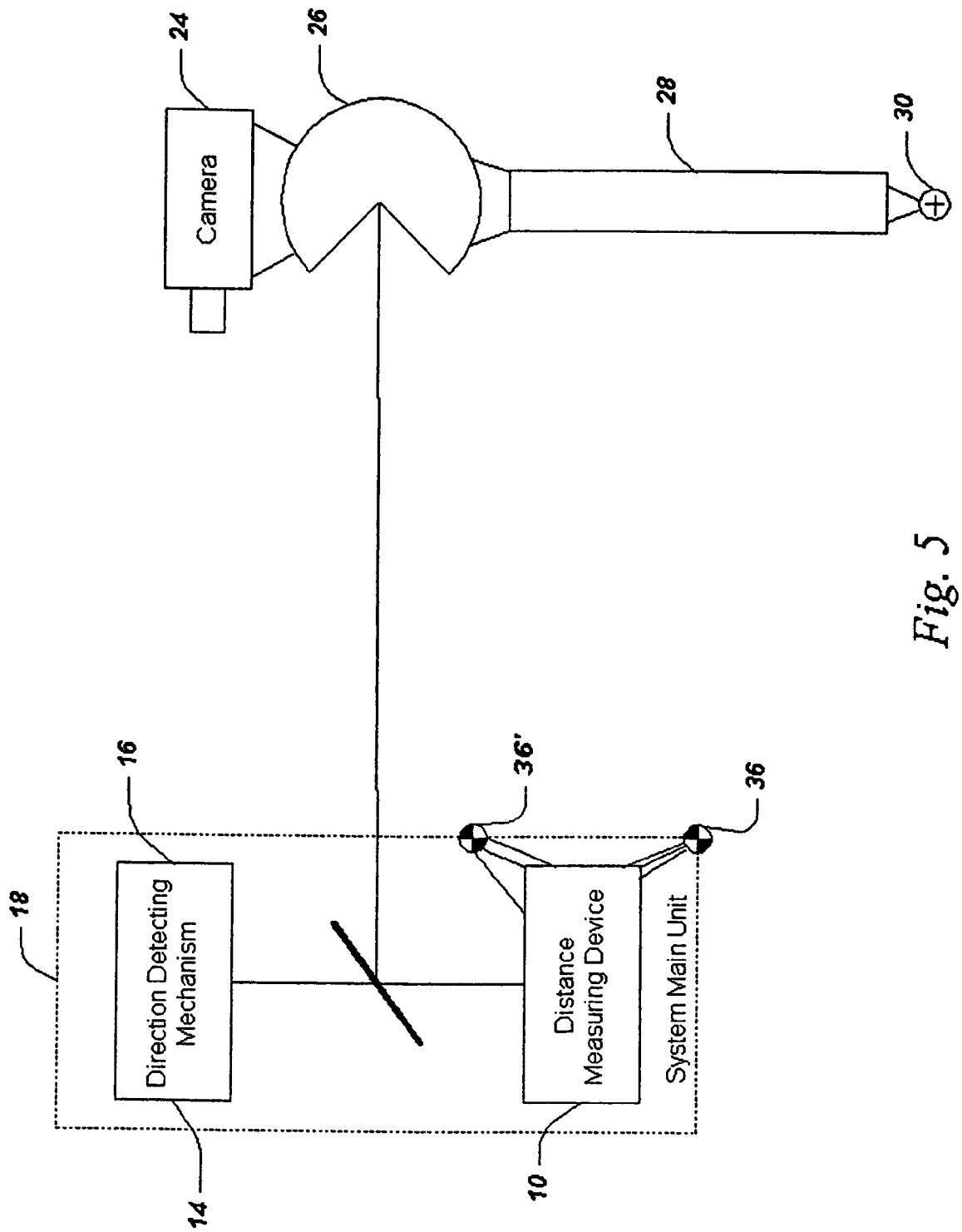
FIG. 5 schematically illustrates the principle operation according to embodiments the invention wherein photogrammetry-based elements and laser tracker elements are combined.

FIG. 4 schematically illustrates an arrangement, according to embodiments of the present invention, of an offset mechanism 32 (such as, e.g., a probe) connected to a reflective object element 26 and an observation mechanism 24 via a mechanism 34 for relative rotation (e.g., a gimbals arrangement). The arrangement further includes means for measuring the relative rotation between the offset mechanism 32 and the reflective object element 26. If the geometry of the arrangement is known, then the position and orientation of the touch point 30 relative to the reflective object element 26 an be determined. The present invention provides systems, frameworks, devices and methods to determine the orientation or rotation of a reflective object element. With reference to FIG. 5, this is done by providing an arrangement or framework (e.g., as shown in FIGS. 3 and 4) of a camera or similar mechanism for observation 24 in a position and orientation that is known relative to a reflective object element 26 such as, e.g., a measurement mirror or prism. Two or more features or targets 36, 36', . . . are provided in positions known relative to a distance measuring device 10. The features or targets 36, 36' may be provided on the distance measuring device 10 itself, or in other locations known relative to the distance measuring device 10. In some embodiments, some of the features or targets 36, 36', . . . may be on the device 10, while others are not. Thus, the features or targets may therefore be mechanically connected with the distance measuring device 10, or they may not, or there may be a combination of mechanically connected and disconnected features or targets. The features or targets 36, 36', . . . may further be any shape elements that are observable by the observation mechanism 24, whether pre-existing or provided for the purpose of operation of the system according to this invention. The features or targets 36, 36', . . . may be any combination of passive and active elements.

The targets 36, 36', . . . may be passive targets including but not limited to simple measurement marks, cross-hairs; retro-reflective targets; and coded retro-reflective targets. Additionally, the targets may be active targets, including light-emitting targets including but not limited to light-emitting diodes (LEDs). In some embodiments both active and passive targets may be used. Some or all of the targets may be represented by predetermined features or shape elements comprising said features inherent in known objects or classes of objects. For a specific orientation of the reflective object element 26 (e.g., measurement mirror or prism), there exists a corresponding specific observation of the two or more targets or features 36, 36', . . . by the observation mechanism (e.g., camera) 24. The orientation of the reflective object element 26 can be calculated from this observation by using the equations found in "Non-Topographic Photo-grammetry" (ISBN 0-944426-10-7), chapter 4-3.2 (equations 4.12). The equation unknowns may be estimated through a least squares process.

If three or more features or targets 36, 36', 36", . . . are provided in positions known relative to the distance measuring device 10, the determination is unique and not dependent on any relative positions and/or orientations. If only two features or targets 36, 36' are provided, only relative rotations can be determined and a continuous series of observations from a known starting point is required to avoid ambiguity in determining the absolute position and orientation. A control unit is provided for calculation of reflective object element position and orientation, and also for further computational tasks such as calculating the position of points measured by probes that may be attached to the reflective object element, such as e.g. an offset mechanism or a surface scanning device. Said control unit is connected to the observation mechanism and the distance measuring device (10) as well as the means 16 for determining direction. Said control unit may further be connected to active targets, target or feature illumination devices, probes, probe gimbals devices etc., depending on the specific embodiment. Said controller may be additional to, or integrated with the controller required for operation of a known laser tracker system.

Thereby, the orientation of the reflective object element such as a measurement mirror or prism can be determined in addition to its spatial position.

The present invention is beneficial in many respects. It is well documented that the error of interferometer systems as well as other systems using an optical distance measurement device depends on the angle between the reflective object element such as a measurement mirror or prism and the light beam projected by the interferometer or distance measurement device. The present invention determines this angle and compensation can be made to moderate or negate this effect.

The invention further makes it possible, for example, to determine the position and orientation of an object in space in six degrees of freedom (three translations, three rotations) by mounting the measurement mirror or prism to the object in a fixed or known position and orientation.

According to a preferred embodiment of the invention it is possible to track the position and orientation of an object moving through space, or to provide guidance in order to position an object in six degrees of freedom in space.

If the interferometer or distance measurement device is placed in a position and orientation known relative to an object A, and the measurement mirror or prism is positioned in a known position and orientation on an object B, the present invention therefore also provides, in a preferred embodiment, for determining the relative position of two objects A and B in six degrees of freedom, or for tracking their relative positions during movement, or for positioning one object relative to the other.

A benefit of the invention is, for instance, to provide for efficient measurement of points other than the center of the reflective object element such as a measurement mirror or prism 12. Once the orientation and the position of the measurement mirror or prism is known, it becomes possible to attach an offset device such as probe 28, for instance, as shown in FIG. 3.

A number of methods can be used to determine the position and orientation of the offset device or the probe stylus 30 relative to the measurement mirror or prism 26. The simplest of these methods may be to position the stylus 30 in a hole of slightly smaller diameter and rotate the measurement mirror or prism 26 around the center of the stylus 30. The measurement mirror or prism will thus describe a sphere with the center of the stylus as its center.

The probe or offset mechanism 28 attached to the reflective object element 26 need not to be of a mechanical type, but could also be of a non-touch type, e.g., as a separate distance measuring device in a known position and pointing in a known direction relative to the reflective object element 26. For example, the offset mechanism or probe 28 may be replaced with a distance measuring device such as a simple laser rangefinder pointing in a known direction.

Further, the reflective object element 26 may be mounted on surface scanning devices. By combining the surface data provided by the surface scanning device—expressed in known device coordinates of the surface scanning system—with the position and orientation data provided by the system according to the invention, the surface data from different scans can be converted into a single, consistent coordinate system independent of the position and orientation of the surface scanner.

The probe or offset mechanism 28 must be in a known position and orientation relative to the reflective object element 26 (measurement mirror or prism), but it need not be in a fixed position. This situation is illustrated in FIG. 4, showing as an offset mechanism a probe 32 that is attached to a reflective object element such as a measurement mirror or prism 26 through a gimbals arrangement 34 that includes a mechanism for determining the relative position and orientation of the two modules 32 and 26. For instance, if the operator controls only the probe module 32, a drive system could be provided for the gimbals in order to make sure the measurement mirror and prism, as well as the observation mechanism 24, is pointing in the desired direction.

Further embodiments of the invention may include a zoom lens provided for the observation mechanism 24, capable of dynamically altering (including limiting) the field of view for the observation mechanism 24 to a field of view necessary to view the features or targets 36, 36', . . . The zoom lens may, in an example embodiment, be controlled based on the received camera image and reduce the image size until two of the features or targets appear inside the image border zone on opposite sides of the image. This addition would provide improved accuracy when operating far from the interferometer or distance measurement device.

While shown in the figures as one camera, in some embodiments the observation mechanism 24 comprises more than one camera. In some embodiments the observation mechanism 24 is one or more one-dimensional linear array cameras.

In some embodiments, the observation mechanism 24 may be moved onto the offset mechanism or probe 32, so that only the reflective object element 26 would be movable relative to the offset mechanism 32. In such embodiments, the center of the gimbals arrangement should preferably coincide with the center of the reflective object element 26. While this embodiment may require manual or other operations to keep the features or targets inside the field of view of the observation mechanism 24, it enables the use of a very simple and inaccurate gimbals arrangement since the gimbals would only be used to avoid breaking the beam from the device 10 to the reflective object element 26, and to avoid the inaccuracies connected with excessive beam angles relative to the reflective object element.

In some embodiments the offset mechanism (28, 32) is a surface scanning system or similar device for simultaneously measuring a plurality of points relative to said reflective object element (26).

Figure 6:
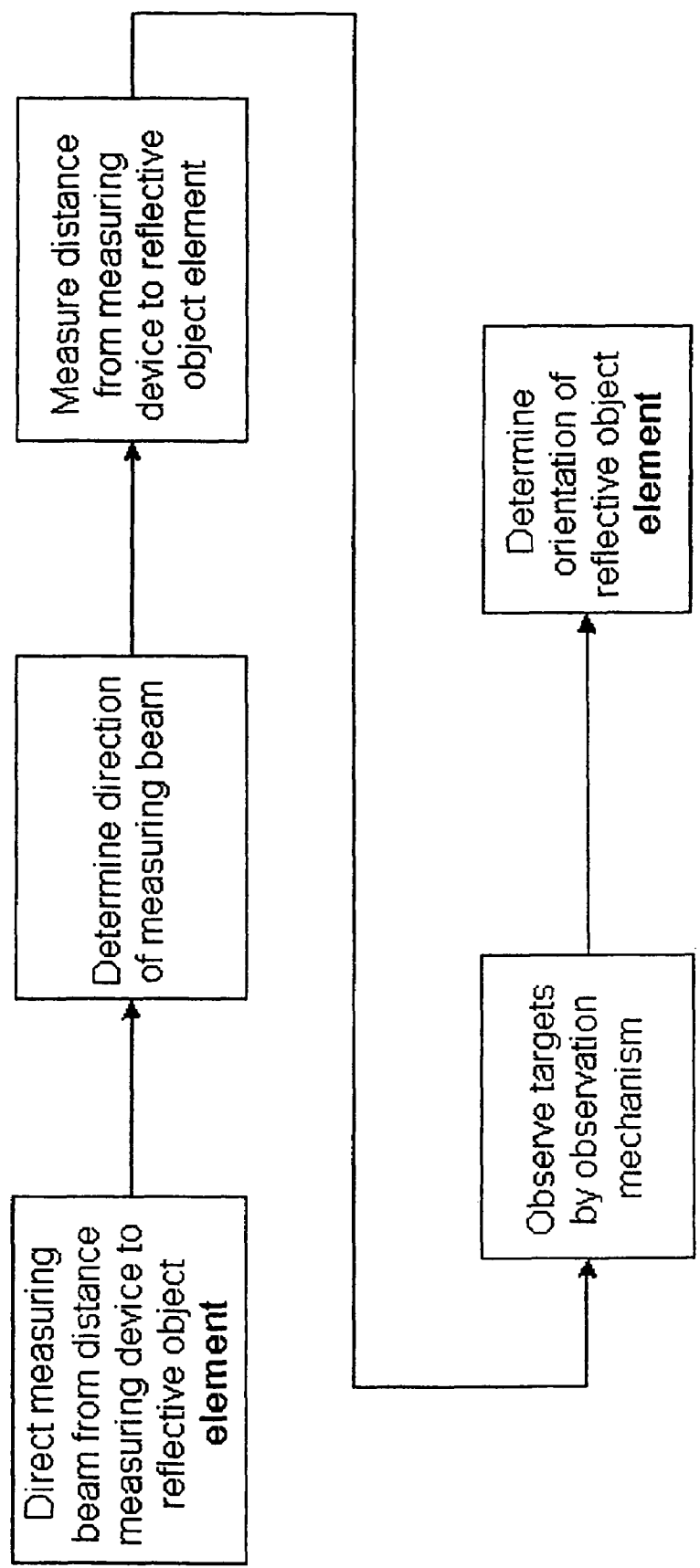
FIG. 6 is a flowchart of a method for measuring spatial coordinates according to embodiments the invention.

In some preferred embodiments of methods for measuring spatial coordinates according to the invention, the following acts are performed (as shown in the flowchart of FIG. 6), preferably following a predetermined sequence:

(a) directing a measuring beam from a distance measuring device 10 to a reflective object element 26, (b) determining the direction of the measuring beam, (c) measuring the distance from the measuring device 10 to the reflective object element 26, (d) observing targets 36, 36', . . . (located in positions known relative to the distance measuring device 10) by observation mechanism 24, located in a known position and orientation relative to the reflective object element 26, and (e) determining the orientation of the reflective object element 26 by observing the targets 36, 36', . . . by the observation mechanism 24.

The invention is applicable to, and presents significant benefits in a very wide range of industrial applications. As an example, applications inside the automotive industry includes uses as diverse as scanning the geometry of clay models during the design phase (using e.g. a surface scanner probe); verifying prototype sheet-metal geometry using a variety of mechanical probes to reach all portions of complex shaped surfaces during soft-die test stamping; aligning upper and lower die halves during production stamping using the procedure described to set one object relative to another; aligning and adjusting prototype and production weld tooling by measuring the locating surfaces; verifying geometry of completed subassemblies and vehicles; and providing general portable geometry measurement to identify geometry related problems throughout the design, engineering and manufacturing processes. A similar wide range of applications applies for other complex assembled products industries like e.g. the aerospace industry where applications would include e.g. so-called jig-less assembly of parts or sub-assemblies like e.g. mating the wing to the fuselage; inspection of machined parts; verification of overall airframe geometry; and verifying the range of movement of flight control surfaces using the procedure described to monitor movement of one object relative to another. The invention is also applicable for most other industries, including e.g. the casting, molding, machining and other industries that require geometry verification of patterns, production equipment and products.

Thus, are provided systems, devices and methods for measurement of spatial coordinates. One skilled in the art will appreciate that the present invention can be practiced by other than the described embodiments, which are presented for purposes of illustration and not limitation, and the present invention is limited only by the claims that follow.

The invention claimed is:

1. A system for measurement of spatial coordinates, the system comprising a probing tool, a main measuring unit, and at least two targets located in known positions relative to said distance measuring device, said probing tool disconnected from said measuring unit, wherein said probing tool comprises:
   a) a reflective object element,
   b) an observation mechanism located in a known position and orientation relative to said reflective object element and capable of observing said at least two targets,
   c) an offset mechanism connected to said reflective object element for measuring points other than the center of said reflective object element by using a know orientation and position of said reflective object element, wherein said offset mechanism is connected with said reflective object element and with said observation mechanism via a mechanism constructed for relative rotation, said mechanism including a mechanism constructed and adapted to measure said rotation;
   and wherein said main measuring unit comprises:
   d) a distance measuring device constructed and adapted to measure a distance from said device to said reflective object element; and
   e) a direction determining mechanism constructed and adapted to determine a direction of a measuring beam;
   whereby
   the orientation of said reflective object element can be determined from observations of said targets by said observation mechanism, using the direction of the measuring beam and the distance from the measuring device to the reflective object element.

2. A system for the measurement of spatial coordinates according to claim 1, wherein said offset mechanism is a mechanical probe or stylus constructed and adapted to be held in contact with points to be measured.

3. A system for measurement of spatial coordinates according to claim 1, wherein said mechanism constructed for relative rotation comprises:
   a gimbals arrangement.

4. A system for measurement of spatial coordinates according to claim 1, wherein said observation mechanism comprises:
   a zoom lens, and
   apparatus for controlling said zoom lens in order to limit the field of view to that necessary to observe said at least two targets.

5. A system for the measurement of spatial coordinates according to claim 1, wherein said offset mechanism is a device for measuring distance and direction relative to said reflective object element.

6. A system for the measurement of spatial coordinates according to claim 1, wherein said offset mechanism is a surface scanning device for simultaneously measuring a plurality of points relative to said reflective object element.

7. A system for the measurement of spatial coordinates according to claim 1, wherein said observation mechanism comprises one or more cameras.

8. A system for the measurement of spatial coordinates according to claim 1, wherein said observation mechanism comprises one or more one-dimensional linear array cameras.

9. A system for measurement of spatial coordinates according to claim 1, wherein said targets are selected from the group of passive targets including but not limited to simple measurement marks, cross-hairs; retro-reflective targets; and coded retro-reflective targets.

10. A system for measurement of spatial coordinates according to claim 1, wherein said targets are active light-emitting targets including but not limited to light-emitting diodes (LEDs).

11. A system for measurement of spatial coordinates according to claim 1, wherein said targets are represented by predetermined features or shape elements comprising said features inherent in known objects or classes of objects.

12. A system for measurement of spatial coordinates according claim 1, wherein said distance measuring device is part of a laser tracker.

13. A system according to claim 1 for measuring the relative spatial position and orientation of an object, wherein the reflective object element with observation mechanism is placed in a known relationship to an object, in such a way that changes observed in position and orientation of the reflective object element correspond to the changes in position and orientation for the object.

14. The use of the system according to claim 1 for measuring the relative spatial position and orientation of a first object and a second object, comprising:
   placing the reflective object element with observation mechanism in a known relationship to the second object,
   positioning a predetermined part of a system comprising said distance measuring device in a known relationship to the first object, and
   determining changes in position and orientation of the reflective object element relative to the predetermined part.

15. The use of the system according to claim 1 for positioning a first object in a known spatial position and orientation relative to a second object, comprising:
   placing the reflective object element with observation mechanism in a known relationship to the second object,
   positioning a predetermined part of a system comprising said distance measuring device in a known relationship to said first object,
   determining changes in position and orientation of the objects relative to each other, corresponding to changes determined in position and orientation of the reflective object element relative to the predetermined part, and
   enabling one object to be moved relative to the other in order to obtain a desired relative spatial position and orientation.

16. A probing tool according to claim 1.

17. A method for measuring of spatial coordinates comprising:
- a) directing a measuring beam from a distance measuring device to a reflective object element,
- b) determining a direction of said measuring beam,
- c) measuring a distance from said measuring device to said reflective object element,
- d) observing at least two targets located in positions known relative to said distance measuring device by observation mechanism located in a known position and orientation relative to said reflective object element, and
- e) determining the orientation of said reflective object element by observing said targets by said observation mechanism, using the direction of the measuring beam and the distance form the measuring device to the reflective object element.

18. A method according to claim 17 for measuring the relative spatial position and orientation of a first object and a second object, comprising:
- positioning the reflective object element with observation mechanism in a known relationship to the second object,
- positioning a predetermined part of a system comprising said distance measuring device in a known relationship to the first object,
- determining changes in position and orientation for the first and second objects relative to each other by determining corresponding changes in position and orientation of the reflective object element relative to said predetermined part.

19. A method according to claim 17 for positioning a first object in a known spatial position and orientation relative to a second object, comprising:
- (a) positioning the reflective object element with observation mechanism in a known relationship to the second object,
- (b) positioning a predetermined part of a system comprising said distance measuring device in a known relationship to said first object,
- (c) determining changes in position and orientation for the first and second objects relative to each other by determining corresponding changes in position and orientation of the reflective object element relative to said predetermined part, and
- (d) enabling one object to be moved relative to the other in order to obtain a desired relative spatial position and orientation.

20. A system for measurement of spatial coordinates according to claim 2, wherein said offset mechanism is connected with said reflective object element and with said observation mechanism via a mechanism constructed for relative rotation, said mechanism including a mechanism constructed and adapted to measure said rotation.

21. A system for measurement of spatial coordinates according to claim 2, wherein said offset mechanism and said observation mechanism are connected with the reflective object element via a gimbals arrangement for relative rotation, including a mechanism constructed and adapted to measure said rotation.

* * * * *

UNITED STATES PATENT AND TRADEMARK OFFICE
CERTIFICATE OF CORRECTION

PATENT NO. : 7,145,647 B2 Page 1 of 1
APPLICATION NO. : 10/779169
DATED : December 5, 2006
INVENTOR(S) : Suphellen et al.

It is certified that error appears in the above-identified patent and that said Letters Patent is hereby corrected as shown below:

At column 1, line 43, after the word "object", delete "to measured itself" and insert therefor --itself to be measured--.

At column 2, line 31, after the word "handle", delete "has" and insert therefor --have--.

In claim 17, at column 9, line 17, after the word "distance", delete "form" and insert therefor --from--.

Signed and Sealed this

Thirteenth Day of March, 2007

JON W. DUDAS
*Director of the United States Patent and Trademark Office*